United States Patent Office 2,912,758
Patented Nov. 17, 1959

2,912,758

PRODUCTION OF DENTURES HAVING MATERIALLY REDUCED TENDENCY TO ADHERE TO CHEWING GUM

Walter Schlesinger, Chicago, Ill., assignor to Wm. Wrigley, Jr., Company, Chicago, Ill., a corporation of Delaware No Drawing. Application March 11, 1955
Serial No. 493,821

16 Claims. (Cl. 32—2)

My invention relates to dental prosthesis and is particularly concerned with the production of dental restorations, of the type of plates (with or without teeth), artificial teeth, jackets, crowns, inlays, facings, bridgework and the like, hereafter for convenience generically identified as dentures, having certain particularly advantageous properties and characteristics in relation to freedom from tackiness with respect to chewing gum.

Dentures of the foregoing types are conventionally made by mixing together resin-forming ingredients to produce a doughy or putty-like mass which is then pressed into a mold cavity and cured. It is usual commercial practice to employ, as the resin-forming ingredients, mixtures of acrylic polymers and acrylic monomers, notably methyl methacrylate polymer and methyl methacrylate monomer (which may contain the usual commercial inhibitors) in proportions of the order of about 2 parts by weight of the polymer to 1 part by weight of the monomer to form the dough-like plastic mass. Such plastic dough is then placed into a plaster or plaster-like mold lined with a denture metal foil, such as tin foil or aluminum foil, or with a thin sheet or film of polyethylene or film-forming alginate composition, so that, when the mold is closed and placed in water or the like at curing temperatures, the curing takes place with the polymerizable acrylic resinous dough in contact with the metal foil or film of polyethylene or alginate, as the case may be. In any event, such dentures have the objectionable property of causing chewing gum, such as chicle-base chewing gums, to adhere thereto when said chewing gum is masticated in the mouth in contact with such dentures. This fact has discouraged large numbers of people, who have artificial dentures, and who enjoy the chewing of gum, from so doing.

I have discovered that artificial dentures made from acrylic resinous materials can be prepared so that they are characterized by substantial freedom from the tendency of chewing gum to adhere thereto when chewing gum is masticated in the mouth in contact with said dentures. This is effected, in accordance with my invention, by contacting said dentures with a solution of a strongly alkaline material for a period of time sufficient to bring about the surface modification of the dentures whereby to effect said reduction in adherence to the chewing gum. Among the strongly alkaline materials which can be utilized with excellent effect are, for example, the caustic alkalies, namely, sodium hydroxide and potassium hydroxide; lithium hydroxide; ammonium hydroxide; trisodium phosphate; sodium carbonate; potassium carbonate; and mixtures of any two or more thereof. Of particular utility are sodium hydroxide and potassium hydroxide. The concentration of the strongly alkaline material in the solutions thereof is suitably in the range of about 1%, preferably about 5%, to about 20%, by weight, although it may be even higher than 20%. I find it very satisfactory, as a general rule, to use an approximately 10% or 10 to 15% solution.

While, under certain circumstances, the pH of the strongly alkaline solution may be as low as 8.8, from a practical standpoint the pH should be at least 10.5 and, still more advantageously, should be 13 or higher. The said alkaline solutions are utilized at temperatures which are not so high as to cause deformation of the shape of the denture. I prefer to operate the solution at room temperature or in the general range of 25 to 30 degrees C. At such temperatures, the dentures are maintained in contact with the said alkaline solutions for a sufficient time to bring about the necessary surface modification of the denture. This will usually be several hours, ordinarily at least about 3½ hours and usually from about 10 to about 18 hours. It will be understood that the higher the concentration of the strongly alkaline solution and the higher the temperature at which said solution is used the shorter may be the time of duration of the treatment. While I have referred to bringing about surface modification of the denture, it should be understood that the effect obtained extends down below the surface for some little depth, which varies with the exact composition of the acrylic resinous material of which the denture is made and the precise treatment to which the denture is subjected pursuant to my invention.

The acrylic resinous materials of which the dentures are made which are treated in accordance with my invention can be any which possess such properties as render them suitable for denture use. Many have heretofore been proposed in the prior art but, for obvious practical reasons, I prefer to utilize those which have heretofore been and are currently conventionally commercially utilized in the art for the making of artificial dentures. Such dentures are, generally, made from doughy mixtures of (1) normally liquid monomers and (2) normally solid, usually granular, polymers, in the form of esters of acrylic acid and esters of lower alkyl acrylic acids such as methacrylates, notably methyl methacrylate. However, as I have indicated, dentures made from various esters of acrylic acid or esters of lower alkyl acrylic acids (e.g. methacrylic acid and ethacrylic acid) can be used, provided that they are productive of resins which meet the physical and like standard requirements for artificial dentures. Current commercial practice involves the utilization, at least largely, of mixtures of (1) methyl methacrylate or other lower alkyl acrylate or methacrylate monomer liquids, with (2) methyl methacrylate polymer (polymethyl methacrylate) powders, or copolymers of methyl methacrylate and ethyl acrylate (or methyl acrylate or ethyl methacrylate), modified by the inclusion of a catalyst (usually benzoyl peroxide), in the production of artificial dentures, and, hence, I find it advantageous to use such acrylic resinous materials and compositions in the practice of my invention. In certain cases, it is desirable to include several percent, for instance, 6 to 14% or somewhat more of acrylate esters, such as methyl acrylate or ethyl acrylate, in the dentures made from polymethyl methacrylates; and/or to add from about 2% to about 12%, preferably about 4% to about 8% of one or more reactable monomeric polar materials, particularly such monomeric polar materials as acrylic acid, methacrylic acid, acrylamide or methacrylamide, to the acrylic resin-forming ingredients of which the dentures are made. Where the denture-forming ingredients contain no polar groups, the ethyl acrylate, where used, should be present in proportions of the order of 30% or more, for instance 40 to 50%, but, of course, not so high as to have an adverse effect on physical properties of the denture. As a general rule, for best results, polar materials should be present, as indicated above. Such additions generally serve to enhance the effects obtained by the treatment of the dentures with the strongly alkaline solutions so far as reduction in adherence to chewing gum is concerned. Where the addition material is utilized, if it is a solid at room temperature, which is the case with methacrylamide and acrylamide, it is convenient to mix it or grind it together with the methyl methacrylate polymer powder or other powdered or granular acrylic polymeric material. Where the addition material is a liquid at room temperature, which is the case with methacrylic and acrylic acids, it is convenient to mix it with the methyl methacrylate monomer liquid before the preparation of the acrylic dough. The aforesaid percentages of said addition materials are by weight of the acrylic denture composition as a whole. Thus, for example, where methacrylic acid is used in admixture with an acrylic resinous composition comprising 1 part, by weight, of methyl methacrylate monomer (liquid) and 2 parts, by weight, of methyl methacrylate polymer (powder), and it is proposed to include methacrylic acid in proportions approximately 2% up to 8% or 10%, by weight, of the mixture of the total of the denture-forming ingredients, the methacrylic acid, which is normally liquid, will, in general, be used to replace a portion of the methyl methacrylate monomer liquid so that the requisite amount of said methacrylic acid will be present. The situation is similar in the case of acrylic acid which, also, is normally liquid. On the other hand, in the case of methacrylamide and acrylamide, which are normally solid, such will, where employed, generally be used to replace a portion of the methyl methacrylate polymer powder. Generally speaking, however, one monomer may be used to replace another monomer, and one polymer may be used to replace another polymer, within limits, irrespective of the solid or liquid character of the monomer, or polymer, as the case may be, provided, of course, that a doughy moldable mass results and provided that proper physical properties are obtained in the finished denture. The doughy mixture of acrylic ester monomer liquid and acrylic ester polymer powder or granular product and the methacrylic acid or other addition material will, in substantially all cases, contain not more than about one-third, by weight, of liquid ingredients. It will also be understood that the proportion of acrylamide or the other addition materials, where utilized, should not be so great as adversely to affect the usual and heretofore obtained physical and like properties characteristic of satisfactory artificial dentures, such as water sorption, solubility, dimensional stability, tissue tolerance, hardness, lack of brittleness, and the like.

It is, generally speaking, desirable, prior to the treatment with the strongly alkaline solution, to buff or grind the denture, for instance with pumice or powdered carborundum (e.g. 120 to 600 mesh), but such buffing or grinding may be done after the treatment with the alkaline solution. Where the buffing or grinding step is employed, it further enhances tack-free properties.

The following examples are illustrative of the production of dentures in accordance with my present invention. Various changes can, of course, be made, within the spirit of the invention and the guiding teachings which I provide herein, without departing from the principles disclosed. In a number of the examples, commercial polymethyl methacrylate denture or dental powders were used which, as is well known, contain minor proportions of plasticizer and peroxide catalyst.

*Example 1*

66.8 parts of a commercial polymethyl methacrylate denture powder containing the usual peroxide catalyst, 14.1 parts methyl methacrylate monomer, 14.1 parts methyl acrylate monomer, and 5 parts methacrylic acid are admixed to form a doughy mass which is then placed in an upper denture mold and polymerized therein in accordance with regular commercial practice. The resulting denture is buffed with wet pumice before final fitting to the subject. The denture is then soaked in an aqueous solution containing 10% sodium hydroxide for about 16 hours at 25 degrees C. It is then thoroughly rinsed in water. The final denture is tack-free to chewing gum.

*Example 2*

66.8 parts of a commercial polymethyl methacrylate denture powder containing the usual peroxide catalyst, 16.6 parts of methyl methacrylate monomer, and 16.6 parts of methyl acrylate monomer are admixed to form a doughy mass which is then placed in an upper denture mold and polymerized therein in accordance with regular commercial practice. The resulting denture is buffed with wet pumice before final fitting to the subject. The denture is then soaked in an aqueous solution containing 10% sodium hydroxide for about 16 hours at 25 degrees C. It is then thoroughly rinsed in water. The final denture is substantially tack-free to chewing gum.

*Example 3*

60 parts of a commercial polymethyl methacrylate polymer containing the usual peroxide catalyst, 14 parts of methyl methacrylate monomer, 13 parts of methyl acrylate monomer, and 3 parts of methacrylic acid are admixed, the resulting doughy mass is packed into a conventional tooth mold, the mold is closed with pressure, and curing is effected by immersing the mold in hot water. The artificial teeth are then soaked for 14 hours in an aqueous solution containing 10% potassium hydroxide, at 25 degrees C., and then are thoroughly rinsed in water. The thus treated artificial teeth are substantially tack-free to chewing gum.

*Example 4*

50 ml. of a 1% solution of polyethyl acrylate in monomeric ethyl acrylate are mixed with 50 ml. of monomeric methyl methacrylate and to said mixture is added 100 mg. of benzoyl peroxide. The resulting mixture is placed in a mold and is heated cautiously until polymerization begins. It is then heated at 70 degrees C. for 4 hours and finally at 100 degrees C. for 1 hour. It is then cooled, removed from the mold and immersed for 15 hours in an aqueous solution containing 12% sodium hydroxide, at 25 degrees C. and then thoroughly rinsed in water. It is substantially tack-free to chewing gum.

*Example 5*

60 parts of a commercial polymethyl methacrylate denture powder containing the usual peroxide catalyst, 27 parts of methyl methacrylate monomer, and 3 parts of acrylic acid are admixed to form a doughy mass which is then packed into a brass denture mold and cured for one-half hour at 70 degrees and then for three-fourths hour at 100 degrees C. The denture is cooled, removed from the mold, ground down slightly to expose a fresh surface of the plastic, then soaked for about 14 hours in an aqueous solution containing 10% sodium hydroxide, at about 28 degrees C., and then thoroughly rinsed with water. It is substantially tack-free to chewing gum.

*Example 6*

60 parts of a commercial polymethyl methacrylate denture powder containing the usual peroxide catalyst, 14 parts methyl methacrylate monomer, 13 parts methyl acrylate monomer and 3 parts methacrylic acid are admixed to form a doughy mass which is then packed into a denture tinfoil-lined mold in accordance with usual commercial practice. Curing is effected at 25 degrees C. for one-half hour, then at 70 degrees C. for one-half hour, and finally at 100 degrees C. for three-fourths hour. After cooling, the denture is removed from the mold, ground down slightly to expose a fresh surface of the plastic, and then soaked for about 16 hours in an aqueous solution containing 10% sodium hydroxide, at about 25 degrees C., and then thoroughly rinsed with water. It is substantially tack-free to chewing gum.

What I claim as new and desire to protect by Letters Patent of the United States is:

1. In a method of treating dentures made from acrylic resinous materials to reduce the tendency of chewing gum to adhere thereto when masticated in contact with such dentures, the step which comprises contacting said dentures with a solution of a strongly alkaline material for a period of time sufficient to bring about a surface modification of said dentures whereby to effect said reduction in adherence to chewing gum.

2. In a method of treating dentures made from acrylic resinous materials to reduce the tendency of chewing gum to adhere thereto when masticated in contact with such dentures, the step which comprises contacting said dentures with an aqueous solution of a caustic alkali for a period of time sufficient to bring about a surface modification of said dentures whereby to effect said reduction in adherence to chewing gum.

3. In a method of treating dentures made from acrylic resinous materials to reduce the tendency of chewing gum to adhere thereto when masticated in contact with such dentures, the step which comprises contacting said dentures with an aqueous solution containing from 1% to 20% of a caustic alkali for a period of time, not less than several hours, sufficient to bring about a surface modification of said dentures whereby to effect said reduction in adherence to chewing gum.

4. In a method of treating dentures to reduce the tendency of chewing gum to adhere thereto when masticated in contact with such dentures, and wherein said dentures are of the type made by polymerizing in a mold acrylic resin-forming ingredients containing from 2% to 12%, by weight, of reactable monomeric polar material, the step which comprises contacting said dentures with a solution of a strongly alkaline material having a pH of at least 10.5 for a period of time sufficient to bring about a surface modification of said dentures whereby to effect said reduction in adherence to chewing gum.

5. In a method of treating dentures to reduce the tendency of chewing gum to adhere thereto when masticated in contact with such dentures, and wherein said dentures are of the type made by polymerizing in a mold acrylic resin-forming ingredients containing from 2% to 12%, by weight, of reactable monomeric polar material, the step which comprises contacting said dentures with an aqueous solution containing from 5% to 20% caustic alkali for a period of time, at least several hours, sufficient to bring about a surface modification of said dentures whereby to effect said reduction in adherence to chewing gum.

6. In a method of treating dentures to reduce the tendency of chewing gum to adhere thereto when masticated in contact with such dentures, and wherein said dentures are of the type made by polymerizing in a mold (a) at least one member of the group consisting of lower alkyl esters of acrylic acid and lower alkyl esters of lower alkyl acrylic acids, and (b) reactable monomeric polar material in proportions between about 2% and 12%, by weight of the final denture composition, the step which comprises contacting said dentures with an aqueous solution of a strongly alkaline material having a pH of at least 10.5 for a period of time, at least several hours, sufficient to bring about a surface modification of said dentures whereby to effect said reduction in adherence to chewing gum.

7. In a method of treating dentures to reduce the tendency of chewing gum to adhere thereto when masticated in contact with such dentures, and wherein said dentures are of the type made by polymerizing in a mold (a) at least one member of the group consisting of lower alkyl esters of acrylic acid and lower alkyl esters of lower alkyl acrylic acids, and (b) reactable monomeric acrylic polar material in proportions between about 2% and 12%, by weight of the final denture composition, the step which comprises contacting said dentures with an aqueous solution containing from 1% to 20% caustic alkali for a period of time, at least several hours, sufficient to bring about a surface modification of said dentures whereby to effect said reduction in adherence to chewing gum.

8. In a method of treating dentures to reduce the tendency of chewing gum to adhere thereto when masticated in contact with such dentures, and wherein said dentures are of the type made by polymerizing in a mold a mixture including, as essential materials, (a) methyl methacrylate polymer and a substantially lesser proportion of methyl methacrylate monomer, and (b) from 4% to 8%, by weight of the final denture composition, of reactable monomeric polar material, the step which comprises contacting said dentures with a solution of a strongly alkaline material having a pH of at least 10.5 for a period of time, at least several hours, sufficient to bring about a surface modification of said dentures whereby to effect said reduction in adherence to chewing gum.

9. In a method of treating dentures to reduce the tendency of chewing gum to adhere thereto when masticated in contact with such dentures, and wherein said dentures are of the type made by polymerizing a mixture including, as essential materials, (a) methyl methacrylate polymer and a substantially lesser proportion of methyl methacrylate monomer, and (b) from 4% to 8%, by weight of the final denture composition, of reactable monomeric polar material selected from the group consisting of acrylic acid, methacrylic acid, acrylamide and methacrylamide, the step which comprises contacting said dentures with a solution of a strongly alkaline material having a pH of at least 10.5 for a period of time, at least several hours, sufficient to bring about a surface modification of said dentures whereby to effect said reduction in adherence to chewing gum.

10. In a method of treating dentures to reduce the tendency of chewing gum to adhere thereto when masticated in contact with such dentures, and wherein said dentures are of the type made by polymerizing a mixture including, as essential materials, (a) methyl methacrylate polymer and a substantially lesser proportion of methyl methacrylate monomer, and (b) from 2% to 10%, by weight of the final denture composition, of reactable monomeric polar material selected from the group consisting of acrylic acid, methacrylic acid, acrylamide and methacrylamide, the step which comprises contacting said dentures with an aqueous solution containing from 1% to 20% caustic alkali for a period of time, at least several hours, sufficient to bring about a surface modification of said dentures whereby to effect said reduction in adherence to chewing gum.

11. An acrylic denture having the property of substantial freedom from the tendency of chewing gum to adhere thereto when said chewing gum is masticated in the mouth in contact with said article, the surface of said denture having been modified by reaction thereof with a solution of a strongly alkaline material for a period of time sufficient to bring about a surface modification of said denture whereby to effect said reduction in adherence to chewing gum.

12. An acrylic denture having the property of substantial freedom from the tendency of chewing gum to adhere thereto when said chewing gum is masticated in the mouth in contact with said denture, the surface of said denture having been modified by reaction thereof with an aqueous solution containing from 1% to 20% caustic alkali for a period of time, at least several hours, sufficient to bring about a surface modification of said denture whereby to effect said reduction in adherence to chewing gum.

13. A denture having the property of substantial freedom from the tendency of chewing gum to adhere thereto when said chewing gum is masticated in the mouth in contact with said denture, said denture being made from a copolymer made from (a) acrylic resin-forming ingredients and (b) from 2% to 12%, by weight of said final denture composition, of reactable monomeric polar material, the surface of said denture having been modified by reaction thereof with an aqueous solution of a strong alkali containing from 5% to 20% caustic alkali for a period of time, at least several hours, sufficient to bring about a surface modification of said denture whereby to effect said reduction in adherence to chewing gum.

14. A denture having the property of substantial freedom from the tendency of chewing gum to adhere thereto when said chewing gum is masticated in the mouth in contact with said denture, said denture being made from a copolymer made from (a) acrylic resin-forming ingredients and (b) from 4% to 8%, by weight of said final denture composition, of reactable monomeric polar material selected from the group consisting of acrylic acid, methacrylic acid, acrylamide and methacrylamide, the surface of said article having been modified by reaction thereof with an aqueous solution of a strong alkali containing from 5% to 20% caustic alkali for a period of time, at least several hours, sufficient to bring about a surface modification of said article whereby to effect said reduction in adherence to chewing gum.

15. An acrylic denture having the property of substantial freedom from the tendency of chewing gum to adhere thereto when said chewing gum is masticated in the mouth in contact with said article, the surface of said denture having been modified by reaction thereof with a solution of a strongly alkaline material having a pH of at least 10.5 for a period of time sufficient to bring about a surface modification of said denture whereby to effect said reduction in adherence to chewing gum.

16. A denture having the property of substantial freedom from the tendency of chewing gum to adhere thereto when said chewing gum is masticated in the mouth in contact with said denture, said denture being made from a copolymer made from (a) acrylic resin-forming ingredients and (b) from 2% to 12%, by weight of said final denture composition, of reactable monomeric acrylic polar material, the surface of said denture having been modified by reaction thereof with an aqueous solution of a strong alkali containing from 1% to 20% caustic alkali for a period of time, at least several hours, sufficient to bring about a surface modification of said denture whereby to effect said reduction in adherence to chewing gum.

References Cited in the file of this patent

UNITED STATES PATENTS

| | | |
|---|---|---|
| 2,369,057 | Leary et al. | Feb. 6, 1945 |
| 2,514,075 | Kelly | July 4, 1950 |
| 2,604,668 | Miller et al. | July 29, 1952 |